United States Patent
Ukrainczyk et al.

(10) Patent No.: US 9,010,153 B2
(45) Date of Patent: Apr. 21, 2015

(54) METHOD OF MAKING SHAPED GLASS ARTICLES

(75) Inventors: Ljerka Ukrainczyk, Painted Post, NY (US); John Robert Saltzer, Jr., Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 357 days.

(21) Appl. No.: 12/493,674

(22) Filed: Jun. 29, 2009

(65) Prior Publication Data

US 2010/0000259 A1     Jan. 7, 2010

Related U.S. Application Data

(60) Provisional application No. 61/077,597, filed on Jul. 2, 2008.

(51) Int. Cl.
| | | |
|---|---|---|
| *C03B 23/025* | (2006.01) | |
| *C03B 23/023* | (2006.01) | |
| *C03B 23/03* | (2006.01) | |
| *C03B 23/035* | (2006.01) | |
| *C03B 40/00* | (2006.01) | |

(52) U.S. Cl.
CPC ......... *C03B 23/0258* (2013.01); *C03B 23/0235* (2013.01); *C03B 23/0307* (2013.01); *C03B 23/0357* (2013.01); *C03B 40/005* (2013.01)

(58) Field of Classification Search
CPC ........................... C03B 23/025; C03B 23/0258
USPC .................... 65/104, 105, 107, 29.19; 53/408
See application file for complete search history.

(56) References Cited

U.S. PATENT DOCUMENTS

| | | | | |
|---|---|---|---|---|
| 3,177,060 | A | * | 4/1965 | Pedersen ........................ 65/106 |
| 4,088,470 | A | * | 5/1978 | Bourg et al. ................... 65/105 |
| 4,313,746 | A | * | 2/1982 | Juras .............................. 65/25.4 |
| 4,711,653 | A | * | 12/1987 | Frank et al. .................... 65/106 |
| 4,822,397 | A | * | 4/1989 | Crossley ........................ 65/107 |
| 5,045,101 | A | | 9/1991 | Hirotsu et al. |
| 5,071,461 | A | * | 12/1991 | Hirotsu et al. ................. 65/104 |
| 5,178,659 | A | | 1/1993 | Watanabe et al. |
| 5,236,486 | A | * | 8/1993 | Blankenbecler et al. ......... 65/61 |
| 5,654,057 | A | | 8/1997 | Kitayama et al. |

(Continued)

FOREIGN PATENT DOCUMENTS

| | | |
|---|---|---|
| FR | 2363528 A1 | 9/1977 |
| GB | 2320021 | 6/1998 |

(Continued)

OTHER PUBLICATIONS

Vogel, Werner. Chemistry of Glass. Wiley, 1985, pp. 22-24.

(Continued)

*Primary Examiner* — Cynthia Szewczyk
(74) *Attorney, Agent, or Firm* — John T. Haran

(57) ABSTRACT

In a method of making shaped glass articles, a glass sheet is placed on a mold having a shaping surface with a desired surface profile of a shaped glass article. The glass sheet is preferentially and rapidly heated by radiation while in the vicinity of the mold so that the mold remains substantially cooler than the glass sheet during the heating. The glass sheet is sagged onto the shaping surface of the mold so that at least a portion of the sagged sheet assumes the desired surface profile of the shaped glass article. After sagging and shaping, the sagged and shaped glass sheet is removed from the mold.

11 Claims, 14 Drawing Sheets

(56) References Cited

U.S. PATENT DOCUMENTS

| | | | |
|---|---|---|---|
| 5,660,609 A * | 8/1997 | Muller et al. | 65/107 |
| 6,983,104 B2 * | 1/2006 | Longobardo et al. | 392/408 |
| 6,990,835 B2 | 1/2006 | Schroeder et al. | |
| 7,000,430 B1 | 2/2006 | Fotheringham et al. | |
| 7,017,370 B1 | 3/2006 | Fotheringham et al. | |
| 7,401,477 B2 | 7/2008 | Inoue et al. | |
| 2002/0051870 A1 | 5/2002 | Honjo et al. | |
| 2004/0206123 A1 | 10/2004 | Fotheringham et al. | |
| 2005/0241815 A1 | 11/2005 | Caze et al. | |

FOREIGN PATENT DOCUMENTS

| | | |
|---|---|---|
| JP | 1987070239 A | 3/1987 |
| WO | 2009/140176 | 11/2009 |

OTHER PUBLICATIONS

Pfaender, Heinz G. Schott Guide to Glass. Van Nostrand Reinhold Company, 1983, pp. 18-21.

Japanese Abstract of 55104931 (Translation), Aug. 11, 1980.

Japanese Abstract of 58007367 (Translation), Jan. 17, 1983.

JP Office Action Aug. 15, 2013.

Third Party Observation, Communication Pursuant to Rule 114(2) EPC; EPO Form 2022 12.07, Nov. 2, 2014, pp. 1-3.

* cited by examiner

METHOD OF MAKING SHAPED GLASS ARTICLES

CROSS-REFERENCE TO RELATED APPLICATIONS

This application claims benefit of provisional application No. 61/077,597, which was filed on Jul. 2, 2008.

FIELD

The invention relates generally to a method for making a shaped glass article. The term "shaped glass article," as used herein, refers to a glass article bounded by a non-planar, open surface. By "open," it is meant that the bounding surface of the glass article does not define a closed volume.

BACKGROUND

Molding is a common technique used to make shaped objects. Shaped glass articles have been made using techniques such as press-molding. In one example, press-molding involves shearing a gob from molten glass and pressing the gob of glass into a desired shape in a mold. While in the mold, the molten glass is exposed to external air. Where the molten glass has to be spread thinly to make a thin-walled glass article having complex curvatures, the molten glass may become cold, or form a cold skin, before reaching the final desired shape. Glass articles formed from a press-molding process as described above may also exhibit one or more of shear marking, warping, optical distortion due to low surface quality, and overall low dimensional precision.

SUMMARY

In a first aspect, a method of making shaped glass articles comprises placing a glass sheet on a mold having a shaping surface with a desired surface profile of a shaped glass article. The glass sheet is preferentially and rapidly heated by radiation while the glass sheet is in the vicinity of the mold so that the mold remains substantially cooler than the glass sheet during the heating. The glass sheet is sagged onto the shaping surface of the mold so that at least a portion of the glass sheet assumes the shaping surface profile. After sagging and shaping, the sagged and shaped glass sheet is removed from the mold.

In the method of the first aspect, the glass sheet may be heated to a temperature below a softening point of the glass sheet. Alternatively, the glass sheet may be heated to a temperature between a softening point and an annealing point of the glass sheet.

In the method of the first aspect, vacuum may be applied in between the glass sheet and the shaping surface during sagging of the glass sheet onto the shaping surface. Optionally, the glass sheet may be allowed to sag towards the shaping surface by gravity prior to applying vacuum in between the glass sheet and the shaping surface. Optionally, the vacuum may be applied in between the glass sheet and the shaping surface before the glass sheet sags towards the shaping surface by gravity.

In the method of the first aspect, the sagged sheet may be cooled down in the mold prior to removing the sagged glass sheet from the mold. Optionally, the sagged glass sheet may be annealed. Optionally the sagged glass sheet may be cut to obtain the shaped glass article in a selected size. Optionally, the cut edges of the shaped glass article may be finished. Optionally, the shaped glass article may be chemically-strengthened by ion-exchange. Optionally, anti-smudge coating may be applied on the shaped glass article.

In the method of the first aspect, the glass sheet may be cut to a net shape required for forming the shaped glass article in a selected size prior to placing the glass sheet on the mold.

In the method of the first aspect, the glass sheet may be placed on a plurality of molds, preferentially and rapidly by radiation while in the vicinity of the plurality of molds, and sagged onto the shaping surfaces of the molds. Optionally, the sagged glass sheet may be diced to obtain a plurality of shaped glass articles. Optionally, the shaped glass articles may be chemically-strengthened by ion-exchange. Optionally, anti-smudge coating may be applied on the shaped glass articles.

In a second aspect, a method of making shaped glass articles comprises placing a glass sheet on a free-sag mold. The glass sheet is heated in the vicinity of the free-sag mold. The glass sheet is pressed with a plunger having a shaping surface with a desired surface profile of a shaped article so that at least a portion of the pressed glass sheet assumes the desired surface profile.

In the method of the second aspect, the glass sheet may be cut to a net shape required for forming the shaped glass article in a selected size prior to placing the glass sheet on the free-sag mold.

In the method of the second aspect, the pressed glass sheet may be annealed.

In the method of the second aspect, the pressed glass sheet may be cut to obtain the shaped glass article in a selected size. Optionally, the cut edges of the shaped glass article may be finished.

In a third aspect, a method of making shaped glass articles comprises placing a glass sheet on a free-sag mold and heating the glass sheet in the vicinity of the free-sag mold. The method further includes allowing the glass sheet to sag naturally by gravity to form a three-dimensional curvature. The method also includes finishing a surface of the glass sheet having the three-dimensional curvature to form the shaped glass article.

Other aspects and modes of the invention will be apparent from the following description and the appended claims.

BRIEF DESCRIPTION OF DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

Figure 1:
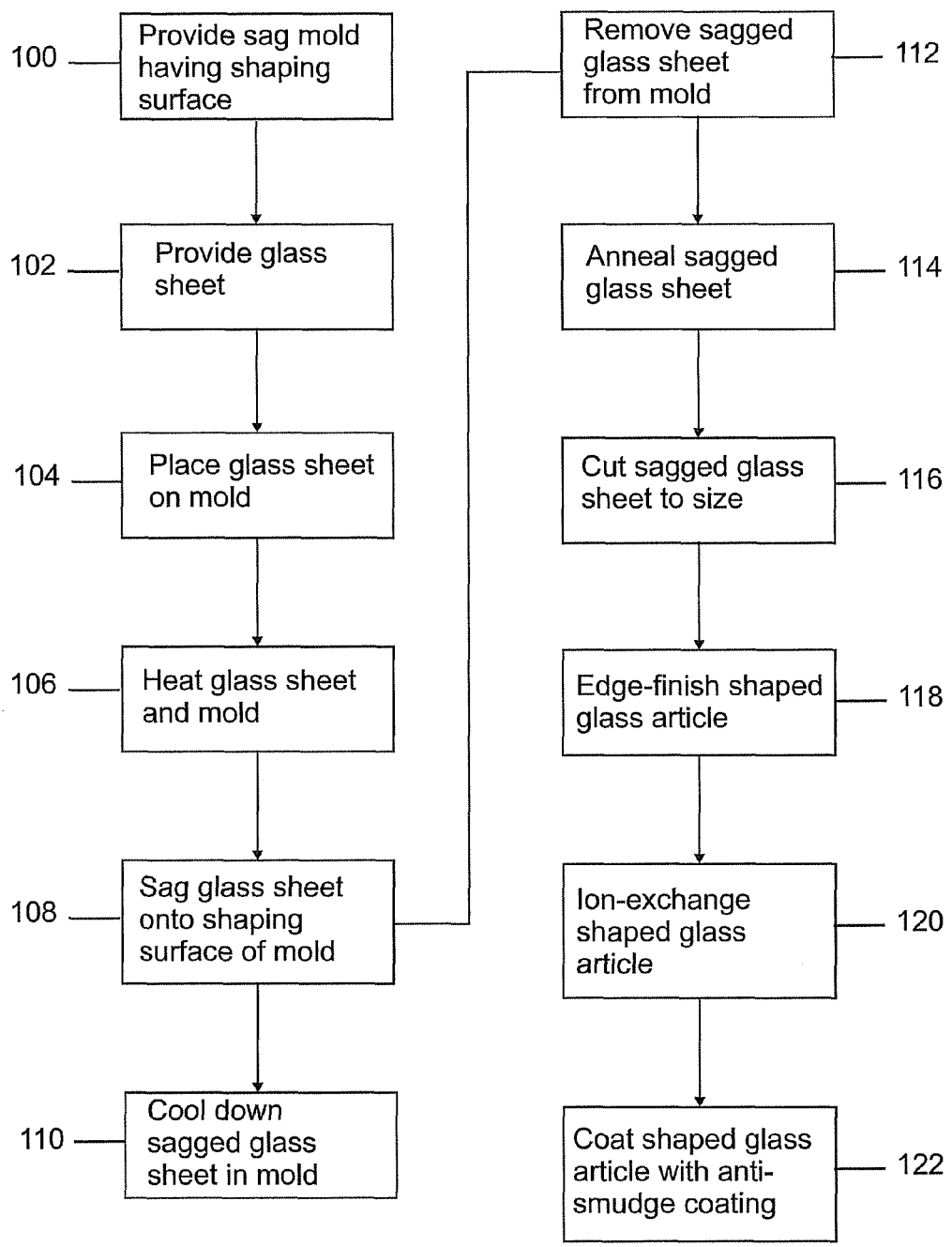
FIG. 1 is a flowchart of a method of making a shaped glass article.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 is a flowchart illustrating a method of making a shaped glass article. As stated in the field of the invention, the term "shaped glass article" means that the glass article has a non-planar, open bounding surface. The bounding surface is also characterized by a bounding surface profile. The bounding surface profile of the glass article may exhibit a simple curvature, i.e., curvature along one independent direction, or a compound curvature, i.e., curvature along more than one independent direction. The method described in FIG. 1, and in subsequent figures, may be used to form a shaped glass article having a bounding surface profile characterized by simple or compound curvatures. Such a shaped glass article may find uses in consumer electronics, such as a smart mouse. The method described in FIG. 1, and in subsequent figures, may be used to form a shaped glass article having a thin wall. Such a thin wall may incorporate simple or compound curvatures. In some examples, the thickness of the wall of the thin-walled shaped glass article formed or formable by the method described in FIG. 1, and in subsequent figures, may range from about 1-3 mm. In some examples, a shaped glass article formed or formable by the method described in FIG. 1, and in subsequent figures, may have a surface of optical quality with polished edge finish.

Figure 2A:
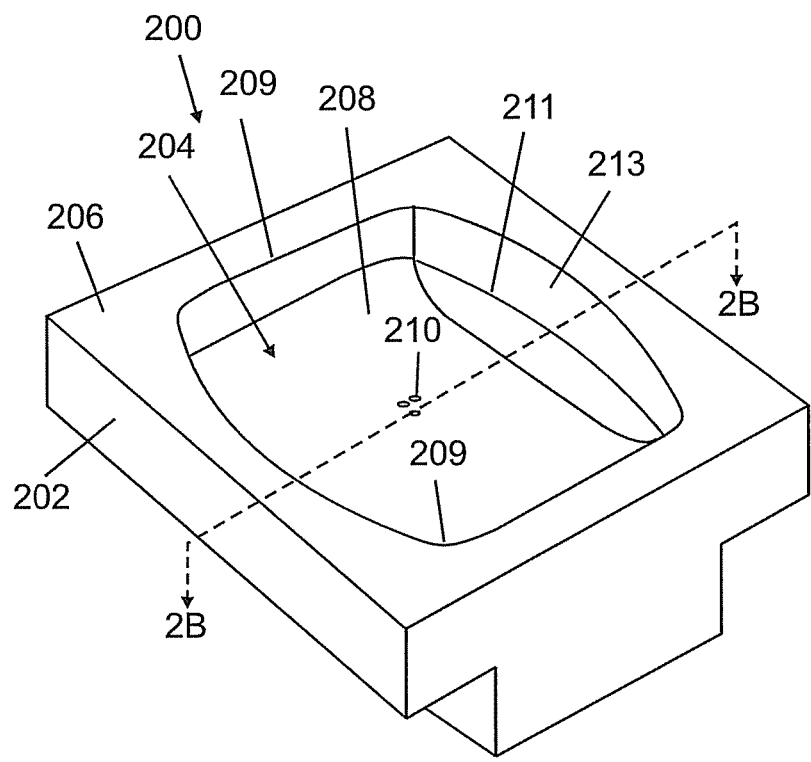
FIG. 2A is a perspective view of a sag mold having a shaping surface.

According to FIG. 1, a method of making a shaped glass article having a bounding surface profile includes providing a sag mold having a shaping surface (100). FIG. 2A shows one example of such a mold. In FIG. 2A, a sag mold 200 includes a mold body 202 having a top surface 206 and a shaping surface 208. The top edges 209 of the shaping surface 208 are contiguous with the top surface 206. The shaping surface 208 extends below the top surface 206 into the mold body 202. The side edges 211, only one of which is visible in the drawing, of the shaping surface 208 are enclosed within the mold body 202 by opposing inner surfaces 213, only one of which is visible in the drawing, of the mold body 202. The shaping surface 208 and inner surfaces 213 define a cavity 204, which is open at the top surface 206. The shaping surface 208 has a shaping surface profile that matches the bounding surface profile of the shaped glass article to be made. As can be appreciated, the shaping surface profile of the shaping surface 208 will vary from that shown in FIG. 2A depending on the bounding surface profile of the shaped glass article to be made.

Figure 2B:
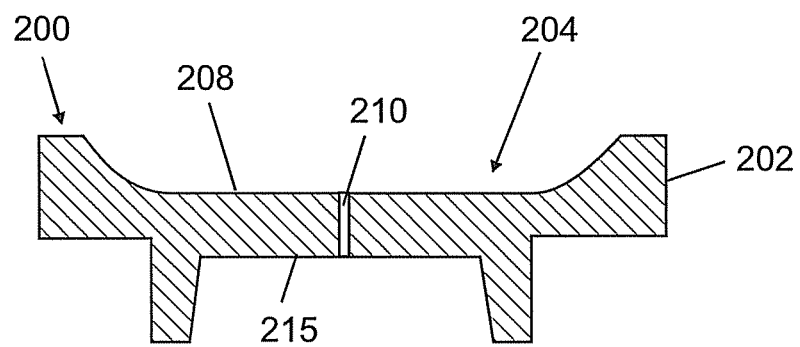
FIG. 2B is a cross-section of the sag mold shown in FIG. 2A along line 2B-2B.
Figure 2C:
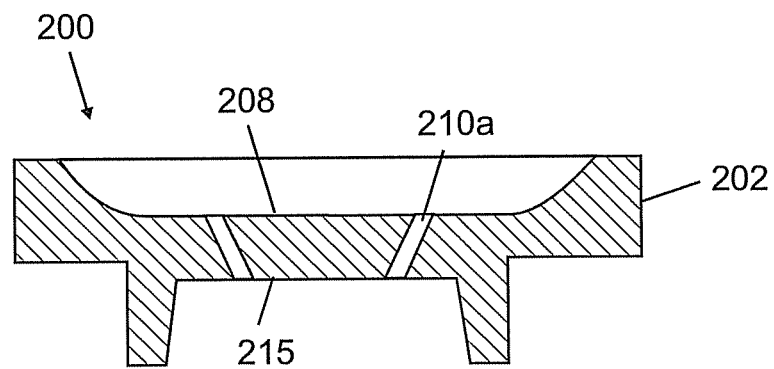
FIG. 2C is a variation of the sag mold shown in FIG. 2B.
Figure 2D:
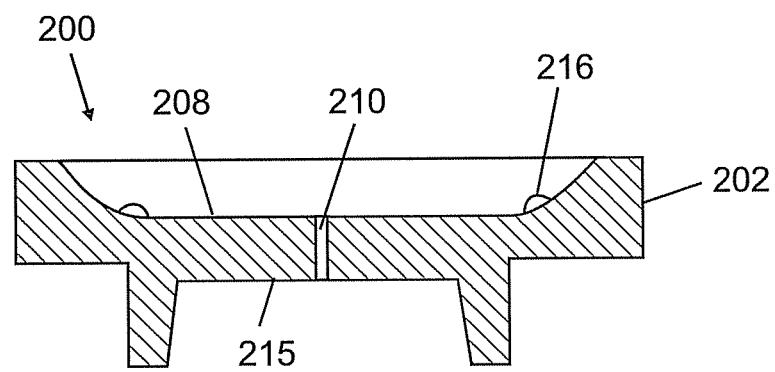
FIG. 2D is another variation of the sag mold shown in FIG. 2B.

The mold body 202 includes one or more slots 210 extending from the bottom surface (215 in FIG. 2B) of the mold body 202 to the shaping surface 208. The slots 210 are arranged to provide communication between the exterior of the mold 200 and the shaping surface 208. In one example, the slots 210 function as vacuum slots. That is, the slots 210 can be connected to a vacuum pump or other device (not shown) for providing vacuum to the cavity 204 through the shaping surface 208. One possible variation to the mold 200 includes, as shown in FIG. 2C, providing slanted slots 210a, rather than the straight slots (210 in FIG. 2B), in the mold body 202. Another possible variation to the mold 200 includes, as shown in FIG. 2D, providing alignment features 216, such as pins, ridges, and other such protuberances, at predetermined locations on the shaping surface 208. Such alignment features 216 may help in placing a glass sheet more accurately on the mold 200. The mold 200 depicted in any of FIGS. 2A-2D may be made of a heat-resistant material, preferably one that would not interact with the material of the glass article being made. As an example, the mold 200 may be made of high temperature steel or cast iron. To extend the life of the mold 200, the shaping surface 208 may be coated with a high-temperature material that would not interact with the material of the glass article being made, e.g., Diamond Chromium coating available from Armoloy.

Returning to FIG. 1, the method of making a shaped glass article includes providing a glass sheet (102). The glass sheet may be made from any glass composition suitable for the application in which the shaped glass article is to be used. In a preferred embodiment, the glass sheet is made from a glass composition that is capable of being chemically strengthened by ion-exchange. Typically, the presence of small alkali ions such as $Li^+$ and $Na^+$ in the glass structure that can be exchanged for larger alkaline-earth ions such as $K^+$ render the glass composition suitable for chemical strengthening by ion-exchange. The base glass composition can be variable. For example, U.S. patent application Ser. No. 11/888,213, assigned to Corning Incorporated, Corning, N.Y., discloses alkali-aluminosilicate glasses that are capable of being strengthened by ion-exchange and down-drawn into sheets. The glasses have a melting temperature of less than about 1650° C. and a liquidus viscosity of at least 130 kpoise and, in one embodiment, greater than 250 kpoise. The glasses can be ion-exchanged at relatively low temperatures and to a depth of at least 30 μm. Compositionally the glass comprises: 64 mol %≤$SiO_2$≤68 mol %; 12; mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≤2 mol %; 2 mol %≤$Na_2O$—$Al_2O_3$≤6 mol %; and 4 mol %≤(Na$_2$O+K$_2$O)—Al$_2$O$_3$≤10 mol %. An exemplary glass that can be used in practicing the invention is Gorilla™ Glass (available from Corning Incorporated, Corning, N.Y., Code 2317).

Figure 3:
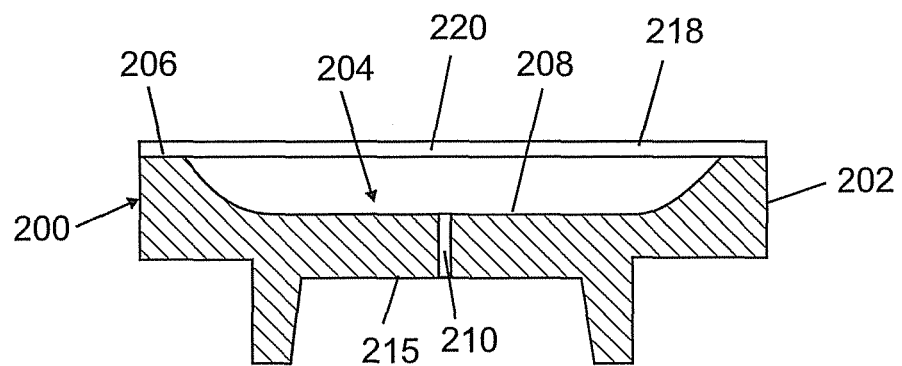
FIG. 3 depicts a glass sheet placed on a sag mold having a shaping surface.
Figure 4:
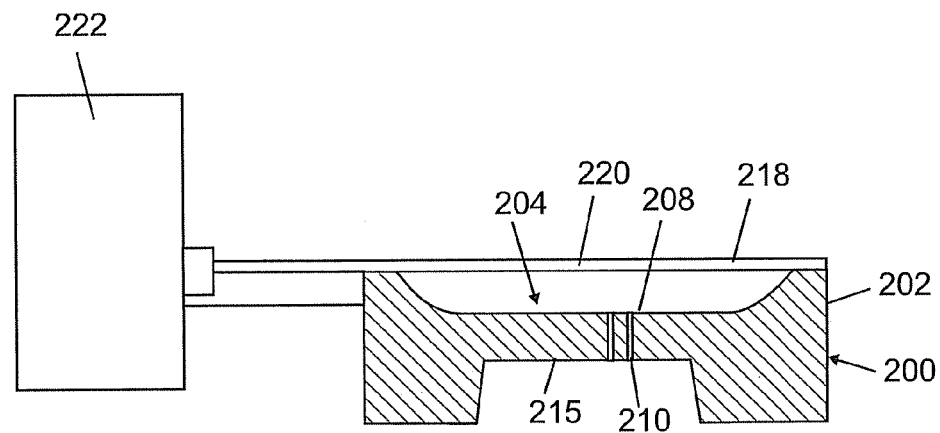
FIG. 4 depicts an inline arrangement whereby a glass sheet is pulled onto a sag mold having a shaping surface.

The method of forming the shaped glass article includes placing the glass sheet on the mold (104). FIG. 3 shows a glass sheet 218, which may have characteristics such as described above, placed on the mold 200 such that a portion 220 of the glass sheet 218 is above the cavity 204 of the mold 200. The glass sheet 218 is placed initially in a flat arrangement on the top surface 206 of the mold 200. This flat relationship between the glass sheet 218 and the mold 200 will change during subsequent steps of the method for making the shaped glass article. The glass sheet 218 may be made by any suitable glass forming process, such as a fusion draw process or a float process. In an inline process, as illustrated in FIG. 4, the glass sheet 218 may be pulled horizontally from a glass melt tank or glass forming device (e.g., a fusion draw device or float bed), or glass post-forming device (e.g., finishing device), generally indicated at 222, onto the mold 200. Typically, the glass sheet 218 is pulled horizontally from the device 222 onto the mold 200. The glass sheet 218 may be a section of a continuous glass sheet or a discrete glass sheet. In a preferred example, the glass sheet 218 is formed by a fusion draw process and has at least one surface of fire-polished quality. In one embodiment, the mold 200 is hot when the glass sheet 218 is placed on it.

Figure 5:
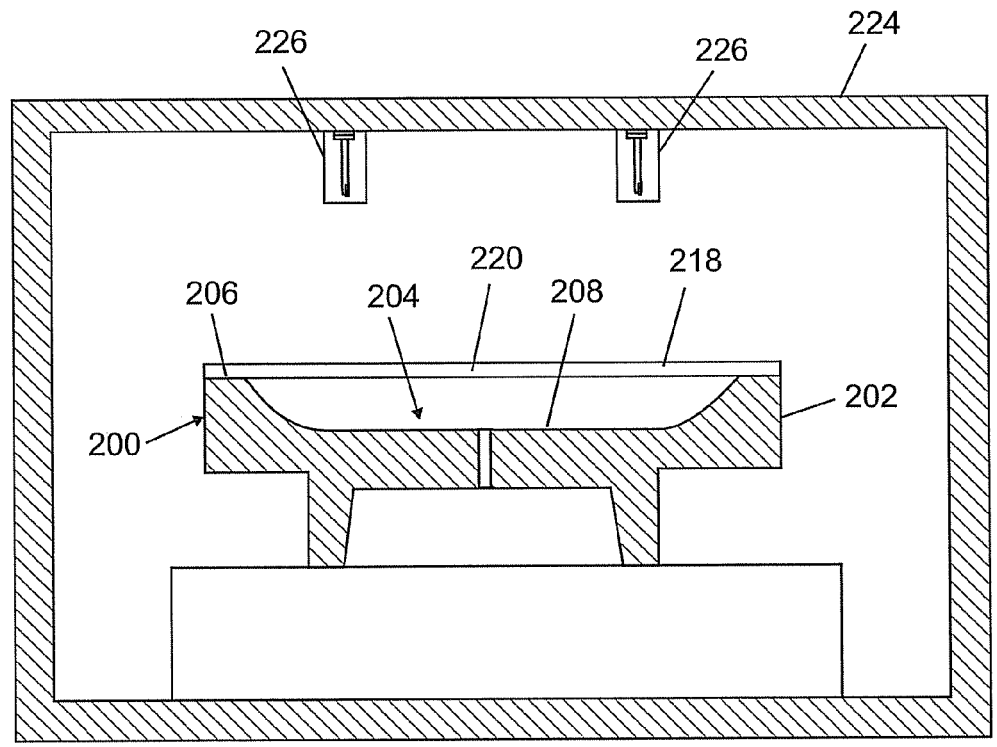
FIG. 5 depicts a glass sheet on a sag mold in a heated space or furnace.

Returning to FIG. 1, the method of making a shaped glass article includes heating the glass sheet and the mold (106). Such heating may be provided while the glass sheet is in the vicinity of the mold. The heating may be provided before or after the glass sheet is placed on the mold and may be maintained for at least a portion of the time the glass sheet is on the mold. Preferably, the glass sheet is heated to or maintained at a temperature below the softening point of the glass sheet for at least a portion of the time the glass sheet is placed on the mold. Preferably, the glass sheet is heated to or maintained at a temperature between the softening point and annealing point of the glass sheet for at least a portion of the time the glass sheet is placed on the mold. The softening and annealing points of the glass sheet are determined by the glass composition from which the glass sheet is made. The glass sheet and mold do not have to register the same temperature. Referring to FIG. 5, the glass sheet 218 may be heated to or maintained at the desired elevated temperature, for example, by placing the glass sheet 218 and the mold 200 in a furnace or a heated zone 224 including one or more heating elements 226. Preferably, the heating elements 226 are arranged in the furnace or heated zone 224 such that they direct heat to the surface of the glass sheet 218. For example, the heating elements 226 may be positioned above the glass sheet 218. Preferably, the heating elements 226 have a fast response to reach the desired temperature quickly. Preferably, the heating elements 226 are enclosed, thereby minimizing the potential to generate particles that could interact with the glass sheet 218. In a preferred example, the heating elements 226 are resistive elements. In a more preferred example, the heating elements 226 are mid-IR (mid-infrared) heaters such as Heraeus Noblelight mid-IR heaters, which have a fast response and resistive elements that are enclosed in quartz glass envelopes. The furnace or heated zone 224 is preferably designed to minimize convection, which can generate particles that can cause defects on the surface of the final glass article. The glass sheet 218 may be placed on the mold 200 before or after the mold 200 is placed in the furnace or heated zone 224.

Figure 6:
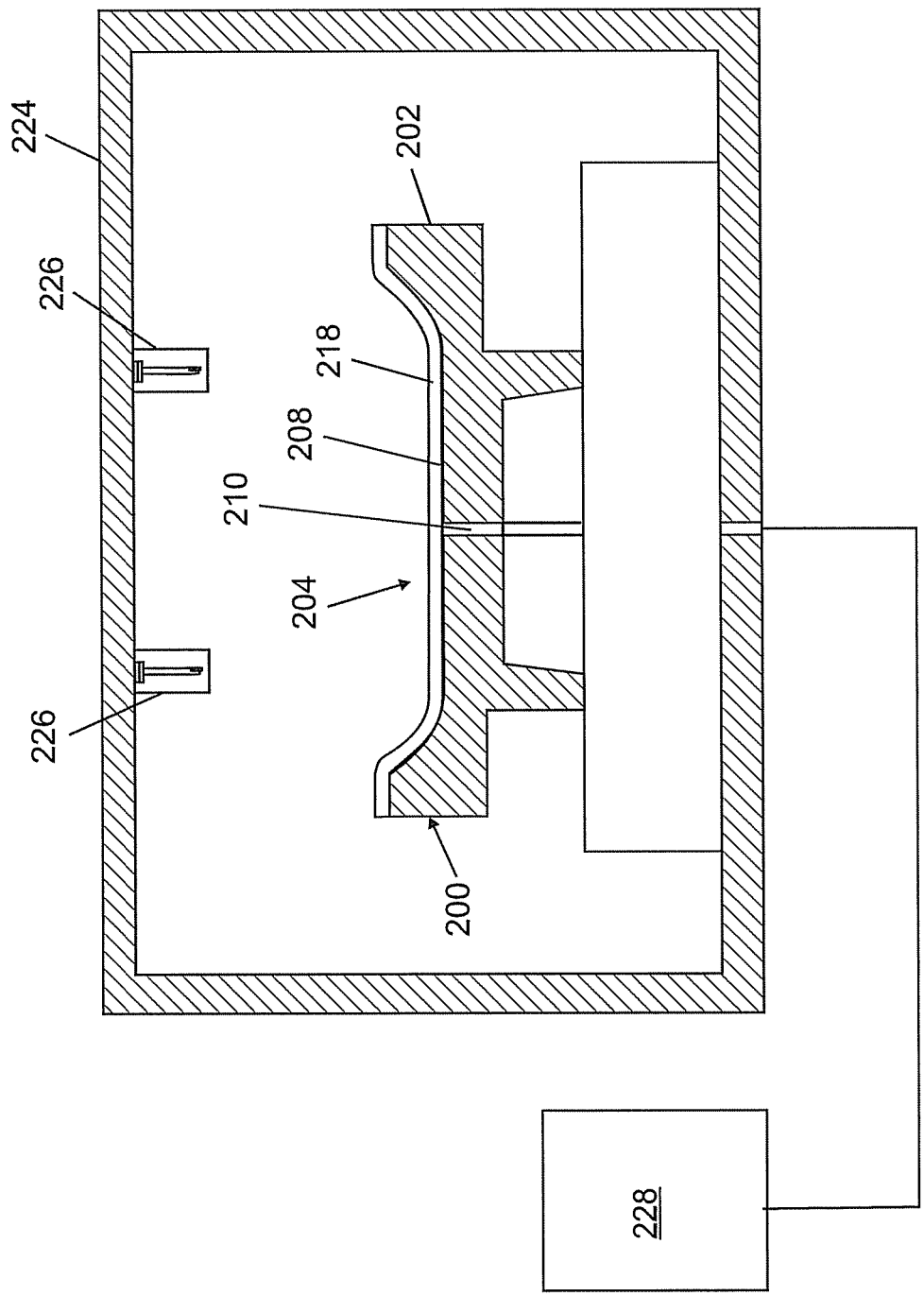
FIG. 6 depicts a glass sheet sagged onto a shaping surface of a sag mold.

Returning to FIG. 1, the method of making a shaped glass article includes sagging the glass sheet onto the shaping surface of the mold (108), whereupon at least a portion of the glass sheet sagged onto the shaping surface assumes the shaping surface profile of the shaping surface. Referring to FIG. 6, sagging the glass sheet onto the shaping surface 208 involves connecting the slots 210 in the mold body 202 to a vacuum pump or other device 228 that can apply vacuum to the mold cavity 204, or the space between the shaping surface 208 and the glass sheet 218. In a preferred example, vacuum is applied to the mold cavity 204 when the viscosity of the glass sheet 218 is at approximately $10^9$ Poise. At the time that vacuum is applied to the mold cavity 204, the glass sheet 218 is at a temperature below its softening point, preferably at a temperature between its softening point and its annealing point. The device 228 applies vacuum to the glass sheet 218 through the cavity 204, pulling the glass sheet 218 into the cavity 204 and against the shaping surface 208 so that the glass sheet 218 assumes the shape of the shaping surface 208. This process of pulling the glass sheet 218 against the shaping surface 208 by vacuum may be referred to as vacuum-sagging. In one example, vacuum-sagging occurs before the glass sheet 218 starts sagging into the mold cavity 204 (or toward the shaping surface) due to gravity. In alternate examples, the glass sheet 218 may be allowed to sag toward or onto the shaping surface 208 by gravity before performing the vacuum-sagging. Vacuum-sagging generally requires that the glass sheet 218 is large enough to cover the open end of the mold cavity 204 before the vacuum is applied to the cavity. In general, allowing the glass sheet 218 to sag by gravity prior to vacuum sagging may result in increased contact between the glass sheet and the shaping, which may affect the surface quality of the glass sheet.

Returning to FIG. 1, the method of making a shaped glass article may further include cooling down the sagged glass sheet (110). This may involve removing the mold with the sagged glass sheet from a furnace or heated zone, as described above, and allowing the sagged glass sheet to cool down while in the mold. Preferably, the sagged glass sheet is allowed to cool down in the mold until its temperature is below the annealing point of the glass sheet. More preferably, the sagged glass sheet is allowed to cool down in the mold until its temperature is below the strain point of the glass sheet. Cooling may be by exposing the mold to ambient air or may include circulating cooling air or gas around the mold and glass sheet. The method of making a shaped glass article may further include removing the sagged glass sheet from the mold (112). The sagged glass sheet may be annealed (114), for example, by placing the sagged glass sheet in an annealing oven. The sagged glass sheet may be cut to obtain the desired shaped glass article with desired dimensions (116). For example, a peripheral portion of the sagged glass sheet may be trimmed off the sagged glass sheet. Suitable multi-axis CNC ("computer numeric control") tools may be used to cut the sagged glass sheet to size, particularly where the sagged glass sheet has a complex shape. After cutting to size, the method may include finishing the edges of the shaped glass article (118). Techniques such as fire-polishing may be used to finish the shaped glass article.

The method may further include chemically-strengthening the shaped glass article by ion-exchange (120). The ion-exchange process typically occurs at an elevated temperature range that does not exceed the transition temperature of the glass. The glass is dipped into a fused salt of alkali having ion radius larger than alkaline ions contained in the glass, and the smaller alkaline ions in the glass are exchanged for the larger alkali ions. The glass is then cooled. The depth of the ion-exchange in the glass is controlled by the glass composition. In general, the deeper the ion-exchange, the higher the surface compression and the stronger the glass. The method may further include applying anti-smudge coating on the shaped glass article (122).

Figure 7:
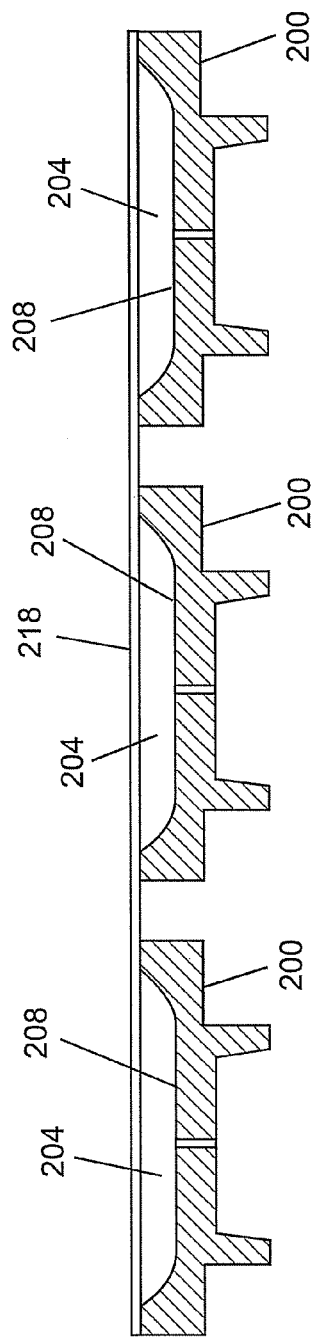
FIG. 7 depicts a glass sheet placed on multiple molds in a method of making multiple shaped glass articles.

The method described above may be varied in one or more ways. In one variation, the method described above is adapted for making multiple shaped glass articles in one shot. The adaptation includes providing multiple molds in step 100 of FIG. 1. The molds are arranged in any desired pattern, but generally close together. The adaptation further includes providing a large enough sheet in step 102 of FIG. 2 to place on the molds. FIG. 7 illustrates step 104 of FIG. 1, i.e., where the glass sheet 218 is placed on the multiple molds 200. In this variation, the shaping surfaces 208 of the molds 200 could have the same shaping surface profiles to make glass articles having the same shape or different shaping surface profiles to make glass articles having different shapes. As previously described, in an inline process, the glass sheet 218 may be pulled horizontally from a glass melt tank, glass forming device, or glass post-forming device and placed on the multiple molds. The remainder of the method continues as illustrated in FIG. 1, or as subsequently described in any of the variations of the method illustrated in FIG. 1. After removing the sagged glass sheet from the molds, the sagged glass sheet can be diced and trimmed to yield the separate shaped glass articles.

Figure 8:
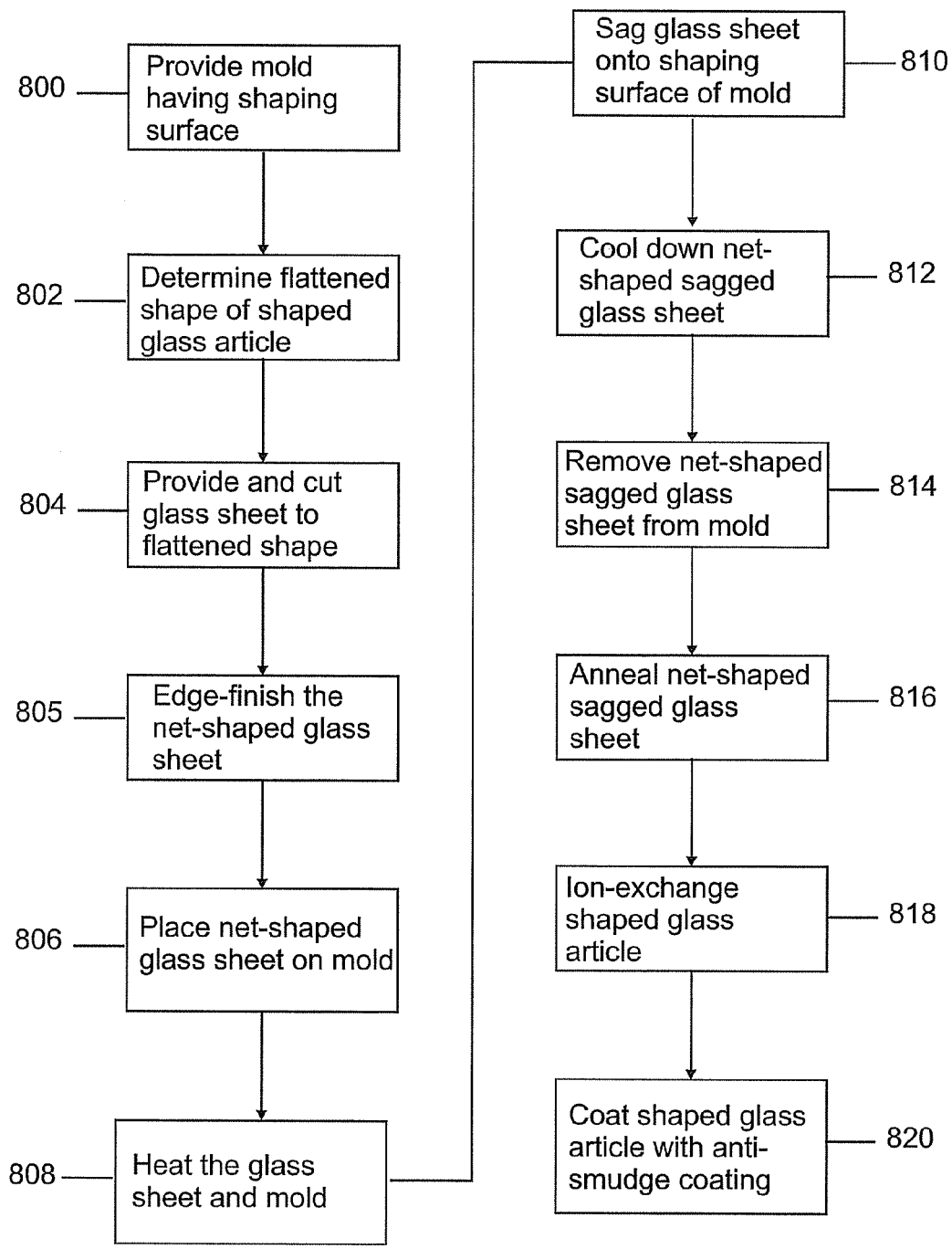
FIG. 8 is a flowchart of a variation of the method of making a shaped glass article shown in FIG. 1.

FIG. 8 is a flowchart illustrating another variation of the method of making a shaped glass article. As in previous examples, the method illustrated in FIG. 8 includes providing a mold having a shaping surface (800). The method further includes determining a flattened shape of the shaped glass article to be made (802). This step is used to determine the exact amount of glass sheet required to form the shaped glass article. The method further includes providing and cutting a glass sheet having the flattened shape (or net shape) (804). The net-shaped glass sheet is edge-finished (805). The glass sheet is then placed on the mold (806). The method further includes heating the glass sheet and mold (808). The glass sheet and mold may be heated to an elevated temperature below the softening point of the glass sheet, preferably between the softening point and annealing point of the glass sheet. Step 808 may occur before step 806 in some variations, and the mold and glass sheet may be heated separately or together. The method includes sagging the glass sheet onto the shaping surface of the mold (810) to form a net-shaped sagged glass sheet. Vacuum-sagging may be used. After sagging, the net-shaped sagged glass sheet is cooled in the mold (812). Cooling may be by exposing the mold to ambient air or may include circulating cooling air or gas around the mold and glass sheet. After cooling, the net-shaped sagged glass sheet is removed from the mold (814). The net-shaped sagged glass sheet is then annealed (816). Unlike the method described in FIG. 1, cutting of the sagged glass sheet to size is not necessary. At this point, the annealed net-shaped sagged glass sheet is the same in shape as the shaped glass article. The method may further include chemically-strengthening the shaped glass article by ion-exchange (818). The method may further include applying anti-smudge coating on the shaped glass article (820). In describing the method variation in FIG. 8, it should be noted that steps which have been adequately described above, with reference to FIGS. 1-7, are not described again in detail. One of the advantages of the variation described in FIG. 8 is that cutting the glass sheet into a net shape before sagging the glass sheet eliminates cutting of the glass sheet after sagging. Before sagging, the glass sheet is still flat (i.e., 2D) and easier to cut. After sagging, the glass sheet has a more complex, non-flat, shape (i.e., 3D).

Figure 9:
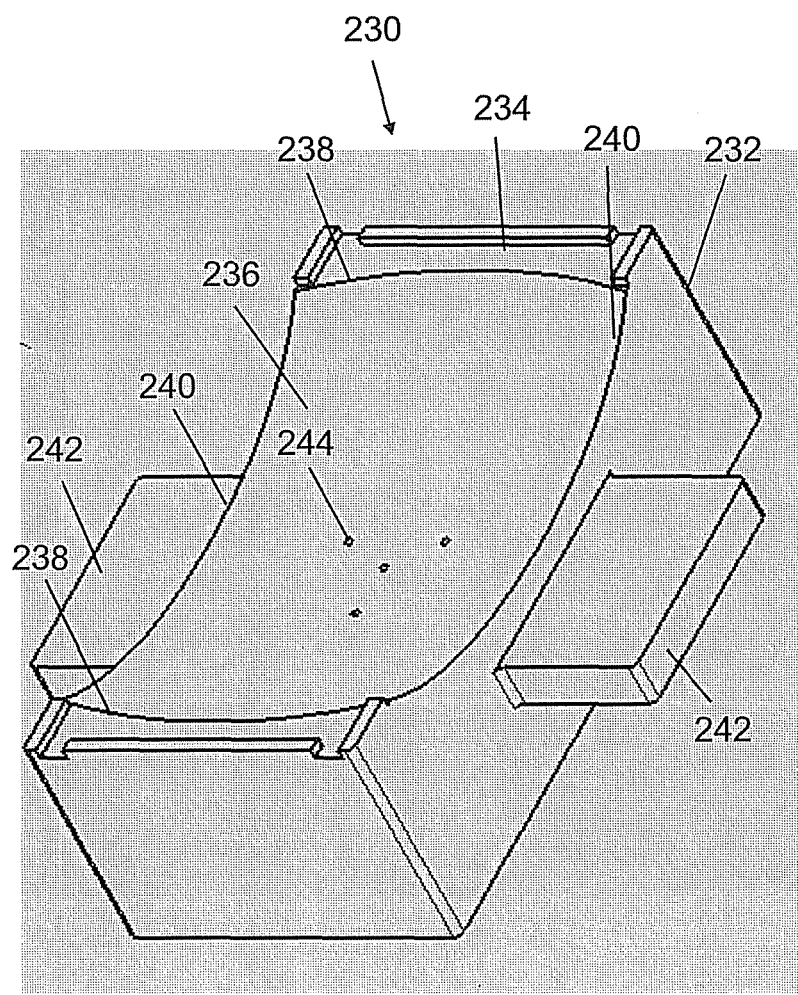
FIG. 9 is a perspective view of another sag mold having a shaping surface.

For the example described in FIG. 8, a different mold than the one shown in FIGS. 2A-2D may be used since the glass sheet is cut to just the size needed to form the shaped glass article. FIG. 9 shows such an alternate sag mold 230. As in the previous example illustrated in FIGS. 2A-2D, the sag mold 230 includes a mold body 232 having a top surface 234 and a shaping surface 236, where the top edges 238 of the shaping surface 236 are contiguous with the top surface 234. The shaping surface 236 has a shaping surface profile that matches the bounding surface profile of the shaped glass article to be made, as previously described in relation to the mold shown in FIGS. 2A-2D. The shaping surface 236 extends below the top surface 234. However, unlike the example illustrated in FIGS. 2A-2D, the side edges 240 of the shaping surface 236 are not enclosed by inner surface of the mold body 232. Handles 242 may be provided on the mold body 202 to facilitate transporting of the mold body 202. Slots 244 extend from the bottom surface (not visible in the drawing) of the mold to the shaping surface 236. The slots 244 may function as vacuum slots, as previously described with respect to the mold in FIGS. 2A-2D. Alignment features (similar to 216 in FIG. 2D) may be provided on the shaping surface 236 to help in registering a net-shaped glass sheet on the shaping surface 236. With mold 230, sagging a glass sheet onto the shaping surface 236 generally requires allowing the glass sheet to sag onto the shaping surface 236 by gravity, or placing the glass sheet on the shaping surface 236, and then pulling the glass sheet against the shaping surface 236 by vacuum, i.e., vacuum-sagging.

Figure 11:
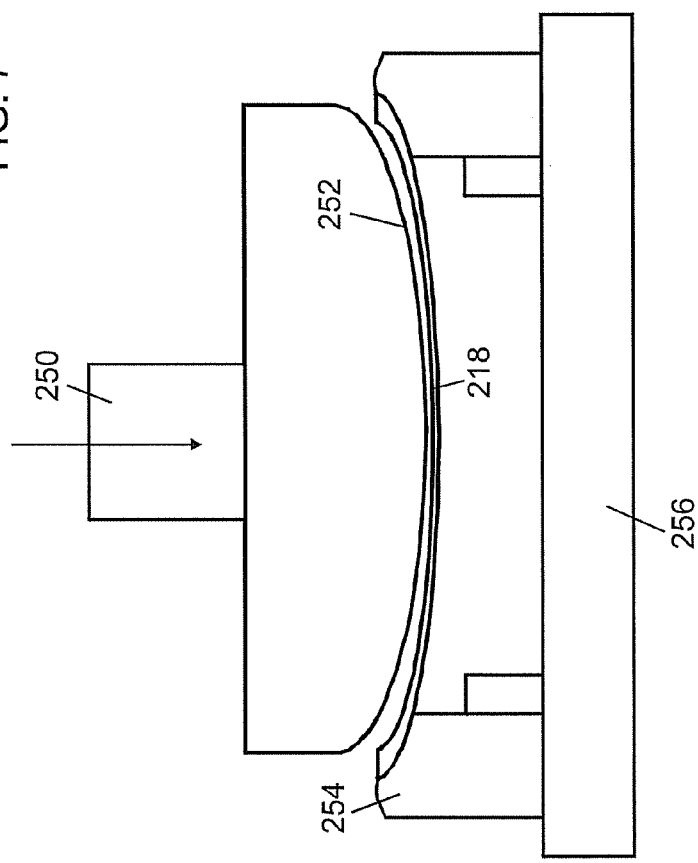
FIG. 11 illustrates pressing of a glass sheet with a plunger having a shaping surface.
Figure 10:
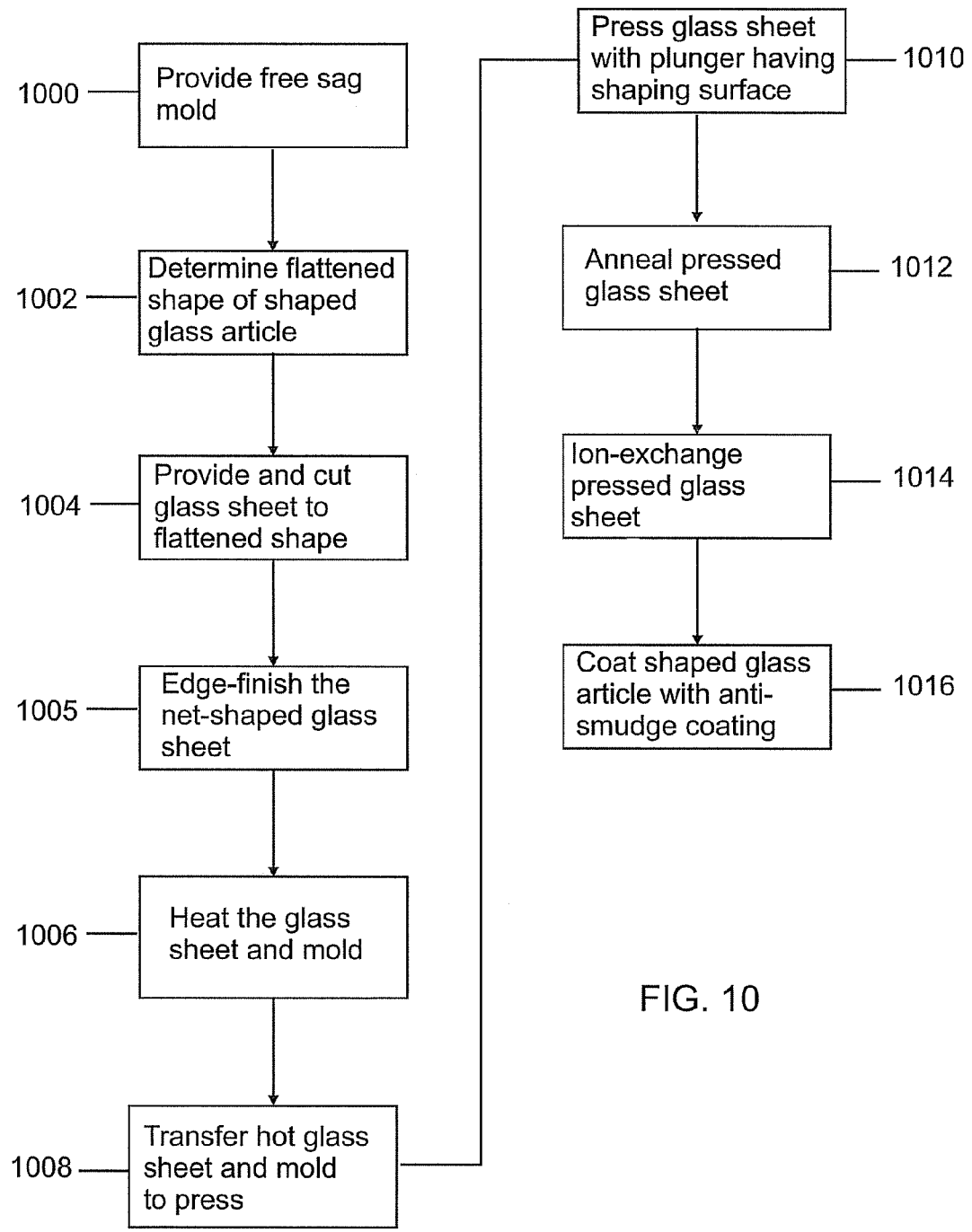
FIG. 10 is a flowchart of another variation of the method of making a shaped glass article shown in FIG. 1.

FIG. 10 illustrates another variation of the method of making a shaped glass article. The method illustrated in FIG. 10 includes providing a free-sag mold (1000). The mold is free-sag in that it does not have a shaping surface as described above. The method includes determining a flattened shape of the shaped glass article to be made (1002). The method also includes providing and cutting a glass sheet having the flattened shape (or net shape) (1004). The net-shaped glass sheet may be edge-finished (1005). The mold and glass sheet are heated (1006) in a furnace or heated space. The glass sheet may be heated to a temperature below the softening point of the glass sheet, preferably between the softening point and annealing point of the glass sheet. While the mold and glass sheet are hot, the glass sheet and mold are removed from the furnace or heated space and transferred to a press (1008). While the mold and glass sheet are hot, the glass sheet is pressed (1010). Referring to FIG. 11, a plunger 250 having a shaping surface 252 presses on the glass sheet 218 while the glass sheet 218 is supported on a free-sag mold 254. After pressing with the plunger 250, the glass sheet 218 assumes the shaping surface profile of the shaping surface 252. The motion of the plunger 250 is controlled such that the glass sheet 218 does not contact the bottom press platform 256 during pressing of the glass sheet. As in the previous examples, the shaping surface profile of the shaping surface 252 of the plunger 250 matches the bounding surface profile of the glass article to be formed. Returning to FIG. 10, after pressing the glass sheet, the pressed glass sheet is annealed (1012). The method may further include chemically strengthening the annealed glass sheet (1014), e.g., by ion-exchange. The method may further include applying anti-smudge coating on the shaped glass sheet (1016). In describing the method variation in FIG. 10, it should be noted that steps which have been adequately described above, with reference to FIGS. 1-9, are not described again in detail.

Figure 12:
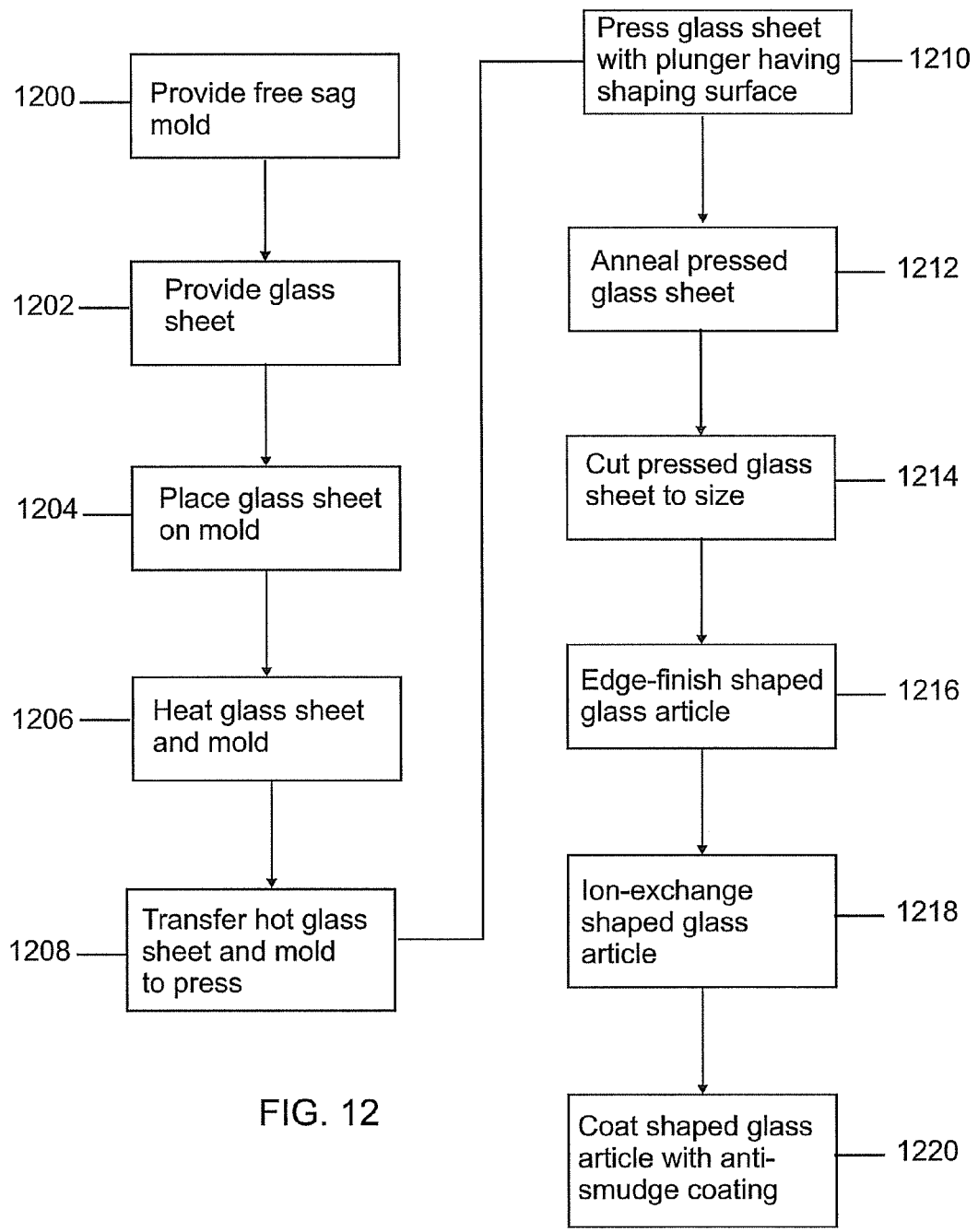
FIG. 12 is a flowchart of yet another variation of the method of making a shaped glass article shown in FIG. 1.

FIG. 12 illustrates another variation of the method of making a shaped glass article. The method illustrated in FIG. 12 includes providing a free-sag mold (1200) and providing a glass sheet (1202). The glass sheet is placed on the free-sag mold (1204). Then, the glass sheet and mold are heated (1206). This may involve, for example, placing the glass sheet and mold in a furnace or heated space. Preferably, the glass sheet is heated to a temperature below the softening point of the glass sheet. More preferably, the glass sheet is heated to a temperature between the softening point and annealing point of the glass sheet. While the mold and glass sheet are hot, the glass sheet and mold are transferred to a press (1208). The glass sheet is pressed with a plunger having a shaping surface (1210), as described above. After pressing the glass sheet, the pressed glass sheet is annealed (1212). The glass sheet is cut to size (1214) to obtain the shaped glass article having the desired dimensions or size. The shaped glass article may be edge-finished (1216). The method may further include chemically strengthening the shaped glass article (1218), e.g., by ion-exchange. The method may further include applying anti-smudge coating to the shaped glass article (1220).

Figure 15:
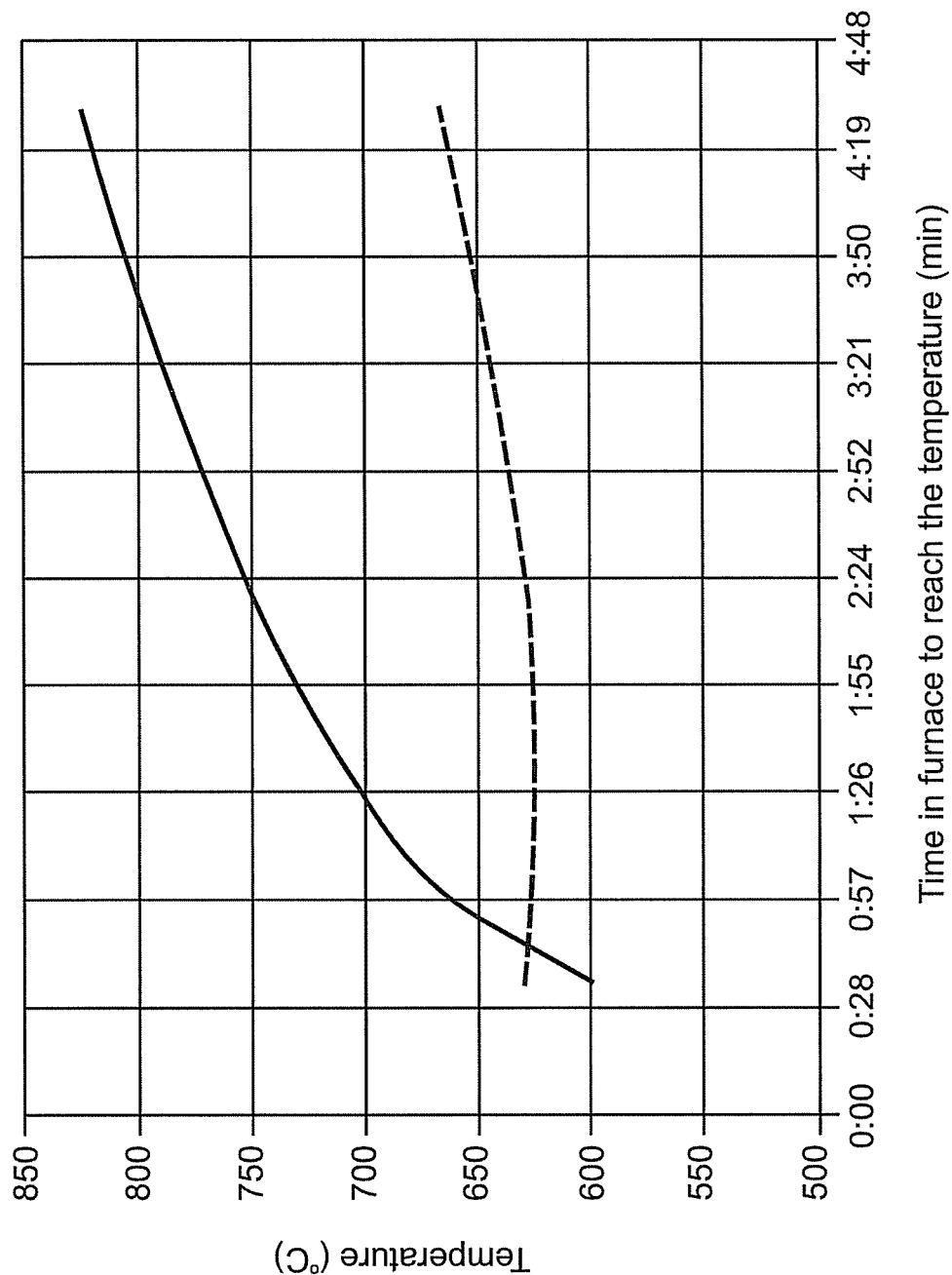
FIG. 15 is a plot of mold and glass temperatures during heating of the glass in the vicinity of the mold by mid-infrared heaters.

The method, along with its variations, described above includes heating the glass sheet while in the vicinity of the mold. Preferably, the glass sheet is preferentially and rapidly heated by radiation while in the vicinity of the mold so that the mold remains substantially cooler than the glass sheet during the heating. This allows the glass article formed by sagging the glass sheet into the mold to have a superior surface quality, extends the mold life, and results in fast cycle time. In the description above, it was mentioned that in a preferred example the heating elements (226 in FIG. 5) are mid-infrared heaters. Mid-infrared heaters can be used to preferentially and rapidly heat the glass sheet while in the vicinity of the mold such that the mold remains substantially cooler than the glass sheet during the heating. In one example, heating may be considered rapid if heating is such that glass temperature increases from room temperature to about 800° C. in 4 minutes or less. FIG. 15 shows an example of rapid heating of a glass sheet in vicinity of a mold. In FIG. 15, the glass sheet reaches a temperature of 800° C. in less than 4 minutes with the mold remaining substantially cooler than the glass sheet. In FIG. 15, when the glass sheet is at about 800° C., the mold is at about 650° C. The glass sheet is heated to a temperature at which it can be sagged into the mold to form the shaped glass article. At this temperature, the difference in temperature between the glass sheet and the mold is at least 100° C., preferably at least 150° C., more preferably at least 175° C., but preferably less than 250° C. The temperature trend shown in FIG. 15 is typical of mid-infrared heating. The mold temperature and glass temperature profiles shown in FIG. 15 are a function of the mold material and glass material, respectively. In this example, the mold material is INCONEL 718, a precipitation-hardenable nickel-chromium alloy, while the glass material is CORNING 2317, an alkali aluminosilicate glass that can be chemically tempered to provide very high damage resistance.

Figure 13:
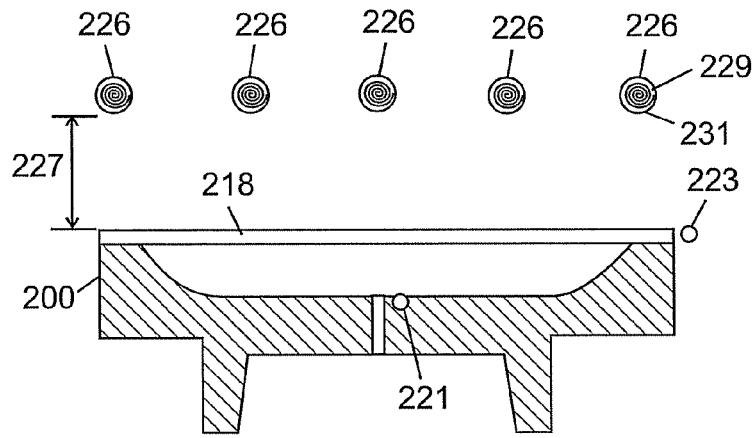
FIG. 13 illustrates preferential heating of a glass sheet on a mold using mid-infrared heaters.

Referring to FIG. 13, mid-infrared heaters 226 are positioned above the glass sheet 218, which is positioned in the vicinity of the mold 200, and may be positioned on the mold 200. Although not shown, the mid-infrared heaters 226, glass sheet 218, and mold 200 may be enclosed within furnace walls (see, for example, furnace 224 in FIG. 5). Any suitable method may be used to suspend the mid-infrared heaters 226 above the glass sheet 218 (one example is shown in FIG. 5). In this arrangement, the mid-infrared heaters 226 are used to preferentially and rapidly heat the glass sheet 218 on the mold 200. "Preferential heating" means that much of the delivered heat goes to heating the glass sheet 218, rather being divided substantially between the glass sheet 218 and the mold 200, thereby allowing for more rapid heating of the glass sheet 218 than the mold 200. "Preferential heating" is achieved because the glass sheet 218 is directly heated by radiation in an optimum spectral range for heating the glass sheet 218.

Each mid-infrared heater 226 has substantial black body radiation energy in the spectral region where the glass sheet 218 has absorption. The spectral region of particular interest is at a wavelength between 2.0 μm and 4.5 μm, where many glasses have significant absorption coefficient due mainly to presence of water, boron, alkali, trace quantities of reduced iron, or other transition metal ions and rare earth metal ions. If the glass needs to have high transmission in the visible regime, the additives to increase mid-infrared absorption are limited to those that do not have spectral absorption below about 2 μm because of overtones in the visible spectrum affecting the glass transmission. It is advantageous to have heating in the spectral range where glass has partial transmission because that enables more uniform heating of glass through its depth. The mid-infrared heater 226 preferably has its heating element 229 enclosed in quartz or fused silica tube 231 in order to protect the life of the heating element, enable rapid heating without contamination of the heating element, and minimize contamination of the glass and mold. The spacing 227 between the glass sheet 218 and the mid-infrared heaters 226 is preferably less than or equal to 50.8 cm. Preferably, there is a line of sight between the glass sheet 218 and the heaters 226 so that the glass sheet 218 is heated directly by absorbing radiation. It should be noted that preferential heating may be employed in any of the glass/mold heating steps of FIGS. 1, 8, 10, and 12.

Figure 14:
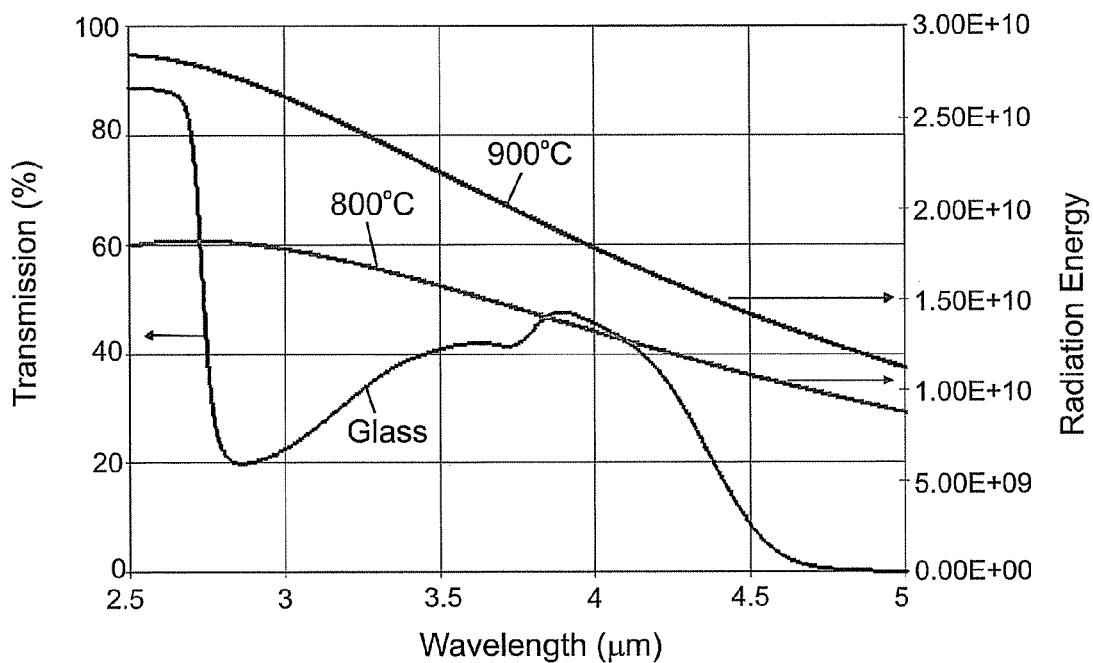
FIG. 14 shows a black body curve of mid-infrared heaters and a transmission curve of a glass.

FIG. 14 shows a black body curve of typical mid-infrared heaters at 800° C. and 900° C. Also shown in this figure is the mid-infrared transmission for a 2-mm thick CORNING 2317 glass. Above 2.5 μm, transmission of the glass decreases and absorption of the glass increases. This increasing absorption occurs in the same spectral range where the mid-infrared heaters have high black body emission energy. Thus glass can be efficiently heated using infrared radiation as the predominant heat transfer mechanism to glass. The optimum glass properties for mid-infrared absorption require that some transmission still be maintained, because if the glass were completely absorbing, only the surface of the glass would heat up by radiation, while the bulk would heat up by conduction. For glass at temperatures above ~500° C., heat transfer by radiation is much faster than for conduction or convection. Therefore, it is preferable to use radiation for rapid heating.

In various examples, which will be described below, shaped glass articles were made by preferentially heating a glass sheet in the vicinity of a mold, as described above, and then sagging the glass sheet into the mold, as previously described, e.g., with reference to FIGS. 1, 6, and 8. In the examples, CORNING 2317 glass was used as the glass sheet. The material for the mold varied, as will be described below. For each part, vacuum-sagging was used to shape the glass sheet into a shaped glass article. The glass sheet was heated such that the glass viscosity was less than $10^{9.1}$ P, preferably less than $10^{8.6}$ P, in order to sag the glass sufficiently close to a complex mold shaping surface (e.g., one having a compound curvature) by vacuum. As an aside, if the mold shaping surface is such that vacuum cannot be used or that vacuum can only be used at the end of the process, then glass viscosity can be between $10^{8.2}$ P and $10^{7.2}$ P, depending on the curvature and shape of the features to be formed. Smaller radii of curvature and steeper angles, as well as complex shapes and finer features, typically require viscosities near or above the softening point of the glass if the shape does not allow for a mold where vacuum can be closed. Alternatively, pressing, as described above, can be used to form the shaped glass article. Sagging starts to occur when the glass sheet is above glass transition temperature, but to conform the glass sheet to the shape of the mold, the glass sheet needs to be at a certain viscosity. Typical viscosities for sagging are between $10^7$P and $10^9$P. The viscosity used depends on the type of shape, as mentioned above. Gentle contours can be formed at higher viscosities, e.g., $10^9$P, while sharper bends and tight radiuses require much lower viscosity. Once the glass sheet reaches the prescribed viscosity, it can be shaped to the mold. The heating elements will typically stay on at least for part of the time during which vacuum is on for vacuum sagging.

In a first example, the mold was made of 310 grade stainless steel (SS 310). SS 310 has a heat capacity of 500 J/Kg-K and a thermal conductivity of 14.2 W/m-k. The temperatures observed while forming the parts according to the first example and the process described above are shown in Table 1 below.

TABLE 1

| Part ID | Mold material | $T_{mold,in}$ (° C.) | $T_{mold,peak}$ (° C.) | $T_{sag}$ (° C.) | Cycle time (min) |
|---|---|---|---|---|---|
| 1275 | SS 310 | 538 | 662 | 780 | 4:33 |
| 1276 | SS 310 | 538 | 664 | 781 | 4:40 |
| 1278 | SS 310 | 543 | 665 | 782 | 4:26 |
| 1279 | SS 310 | 540 | 665 | 782 | 4:24 |
| 1280 | SS 310 | 544 | 661 | 782 | 4:17 |
| Average | | 540.6 | 663.4 | 781.4 | 4:28 |

For the parts shown in Table 1, a first thermocouple (221 in FIG. 13) was placed in the center of the mold to measure mold temperature. $T_{mold,in}$ was the temperature recorded by the first thermocouple when the mold entered the furnace with the glass sheet for sagging. The process was controlled to maintain the $T_{mold,in}$ constant at a nominal value of 550° C. The observed difference between the numbers reported in Table 1 and 550° C. is due to thermal conductivity and heat capacity of mold material, as well as thermal mass differences. $T_{mold,peak}$ was the maximum temperature measured by the first thermocouple during the sagging process. A second thermocouple (223 in FIG. 13) was placed in the plane of the glass before sagging the glass into the mold. $T_{sag}$ is the temperature recorded by the second thermocouple. In Table 1, average $T_{mold,peak}$ is approximately 120° C. lower than $T_{sag}$. Cycle time is the time from when the glass sheet and mold are placed into the mid-infrared furnace until the time the mid-infrared furnace is opened.

In a second example, INCONEL 718 was used as the mold material. INCONEL 718 has a heat capacity of 435 J/Kg-K and a thermal conductivity of 11.4 W/m-K, i.e., a lower heat capacity and thermal conductivity than that of SS 310 of the first example. The temperatures observed while forming the shaped glass articles according to the second example and the process described above are shown in Table 2 below. The average $T_{mold,peak}$ in Table 2 is approximately 60° C. lower than the average $T_{mold,peak}$ in Table 1. This shows that it is possible to decrease $T_{mold,peak}$ by using a mold material having a relatively low heat conductivity and heat capacity.

TABLE 2

| Part ID | Mold material | $T_{mold,in}$ (° C.) | $T_{mold,peak}$ (° C.) | $T_{sag}$ (° C.) | Cycle time (min) |
|---|---|---|---|---|---|
| 1235 | Inconel 718 | 546 | 603 | 781 | 4:50 |
| 1236 | Inconel 718 | 547 | 604 | 781 | 4:47 |
| 1237 | Inconel 718 | 546 | 604 | 781 | 4:49 |

TABLE 2-continued

| Part ID | Mold material | $T_{mold,in}$ (° C.) | $T_{mold,peak}$ (° C.) | $T_{sag}$ (° C.) | Cycle time (min) |
|---|---|---|---|---|---|
| 1240 | Inconel 718 | 546 | 605 | 781 | 4:56 |
| 1241 | Inconel 718 | 546 | 605 | 781 | 4:51 |
| Average | | 546.2 | 604.2 | 781 | 4:50 |

In a third example, silicon carbide was used as the mold material. Silicon carbide has a heat capacity of 750 J/Kg-K and a thermal conductivity of 120 W/m-K, i.e., a higher heat capacity and thermal conductivity than that of INCONEL 718 in the second example and SS 310 in the first example. The temperatures observed while forming the shaped glass articles according to the third example and the process described above are shown in Table 3 below. The difference between mold and glass temperatures in the third example was similar to that of the first example.

TABLE 3

| Part ID | Mold material | $T_{mold,in}$ (° C.) | $T_{mold,peak}$ (° C.) | $T_{sag}$ (° C.) | Cycle time (min) |
|---|---|---|---|---|---|
| 1314 | SiC | 534 | 645 | 767 | 5:50 |
| 1315 | SiC | 551 | 659 | 769 | 5:58 |
| 1316 | SiC | 550 | 656 | 770 | 5:50 |
| 1317 | SiC | 550 | 661 | 769 | 6:05 |
| Average | | 546.3 | 655.3 | 768.8 | 5:55 |

In a fourth example, the mold was made of 310 grade stainless steel (SS 310), but $T_{mold,in}$ was lowered from 550° C. to 500° C. (in the first to third examples, $T_{mold,in}$ was 550° C.). The temperatures observed while forming the shaped glass articles according to the fourth example and the process described above are shown in Table 4 below.

TABLE 4

| Part ID | Mold material | $T_{mold,in}$ (° C.) | $T_{mold,peak}$ (° C.) | $T_{sag}$ (° C.) | Cycle time (min) |
|---|---|---|---|---|---|
| 1309 | SS 310 | 491 | 684 | 780 | 7:00 |
| 1310 | SS 310 | 500 | 677 | 780 | 6:44 |
| 1311 | SS 310 | 491 | 678 | 779 | 6:25 |
| 1312 | SS 310 | 497 | 678 | 780 | 6:14 |
| 1313 | SS 310 | 496 | 675 | 779 | 6:25 |
| Average | | 495 | 678.4 | 779.6 | 6:33 |

In a fifth example, the mold was made of INCONEL 718, but $T_{mold,in}$ was lowered from 550° C. to 500° C. (in the first to third examples, $T_{mold,in}$ was 550° C.). The temperatures observed while forming the shaped glass articles according to the fifth example and the process described above are shown in Table 5 below.

TABLE 5

| Part ID | Mold material | $T_{mold,in}$ (° C.) | $T_{mold,peak}$ (° C.) | $T_{sag}$ (° C.) | Cycle time (min) |
|---|---|---|---|---|---|
| 1253 | Inconel 718 | 489 | 630 | 780 | 8:54 |
| 1254 | Inconel 718 | 495 | 633 | 780 | 9:03 |
| 1255 | Inconel 718 | 496 | 638 | 780 | 9:07 |
| 1305 | Inconel 718 | 500 | 651 | 780 | 9:17 |
| 1306 | Inconel 718 | 500 | 645 | 780 | 9:07 |
| Average | | 496 | 639.4 | 780 | 9:05 |

Tables 4 and 5 above show how the cycle time and $T_{mold,peak}$ are affected by a lower $T_{mold,in}$. Decreasing $T_{mold,in}$ by 50° C., i.e., from 550° C. to 500° C., does not decrease the difference in mold and glass temperatures and increases cycle time. This is due to conduction of heat away from the glass sheet that is being heated rapidly through radiation heating. The results suggest that keeping the mold cooler than approximately 250° C. beyond $T_{sag}$ may adversely affect the process cycle time and may not allow the full advantage of rapid direct heating of glass by mid-infrared radiation to be taken because of heat loss from the glass by conduction to the mold.

Figure 16:
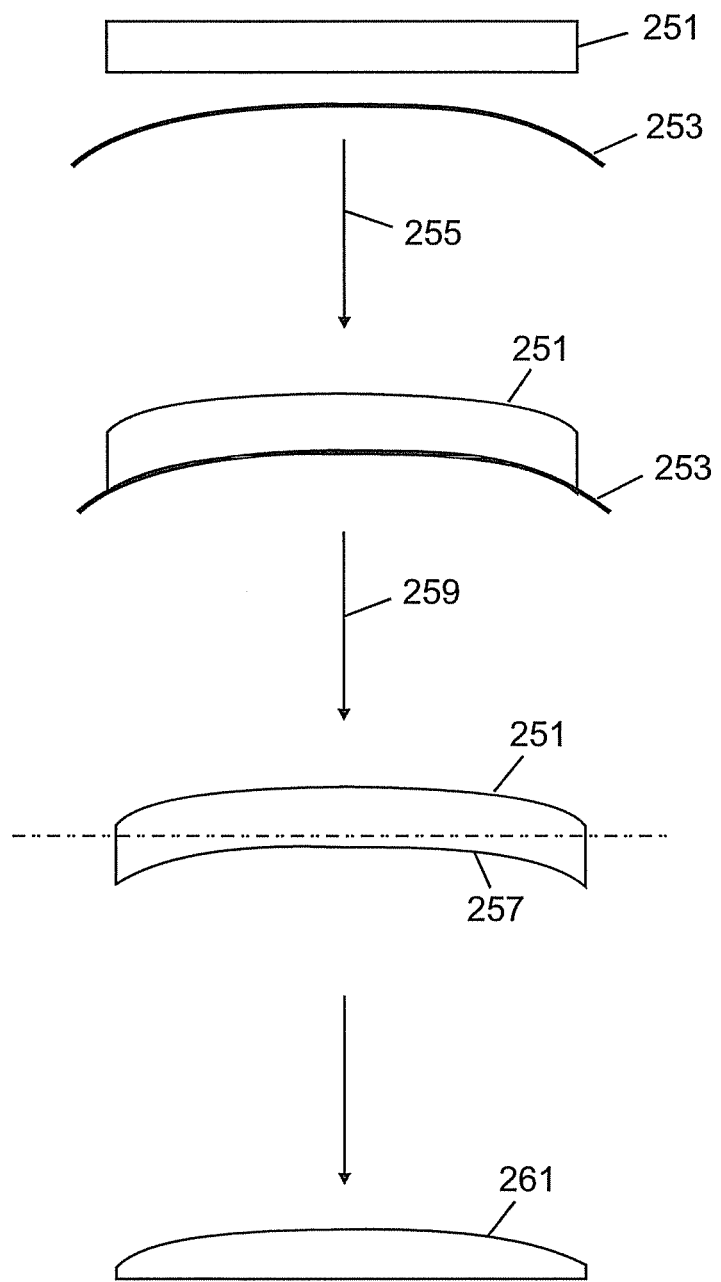
FIG. 16 illustrates a method of forming a shaped article using a mold having a concave shaping surface.

The method, and its variations, described above is not limited to a mold having a concave shaping surface. In other examples, the mold may have a convex shaping surface. In this case, the glass sheet is brought into the vicinity of the convex mold, heated as explained above, and then sagged onto the convex mold. FIG. 16 is a simplified schematic of the process, where a glass sheet 251 is brought into the vicinity of a convex mold 253. The glass sheet 251 is sagged onto the convex mold 253, as indicated by arrow 255. After sagging, the sagged glass sheet 251 is cooled and removed from the mold 253. The concave surface 257 of the sagged glass sheet 251 is flattened, e.g., by grinding, lapping, and polishing, as indicated by arrow 259. The final glass article, having a plano-convex shape, is shown at 261. The glass article 261 may be subjected to any of the additional steps shown in FIG. 1 or FIG. 8 and described above. For example, the shaped article 261 may be subjected to one or more of annealing, chemically-strengthening by ion-exchange, and coating with anti-smudge coating.

Figure 17:
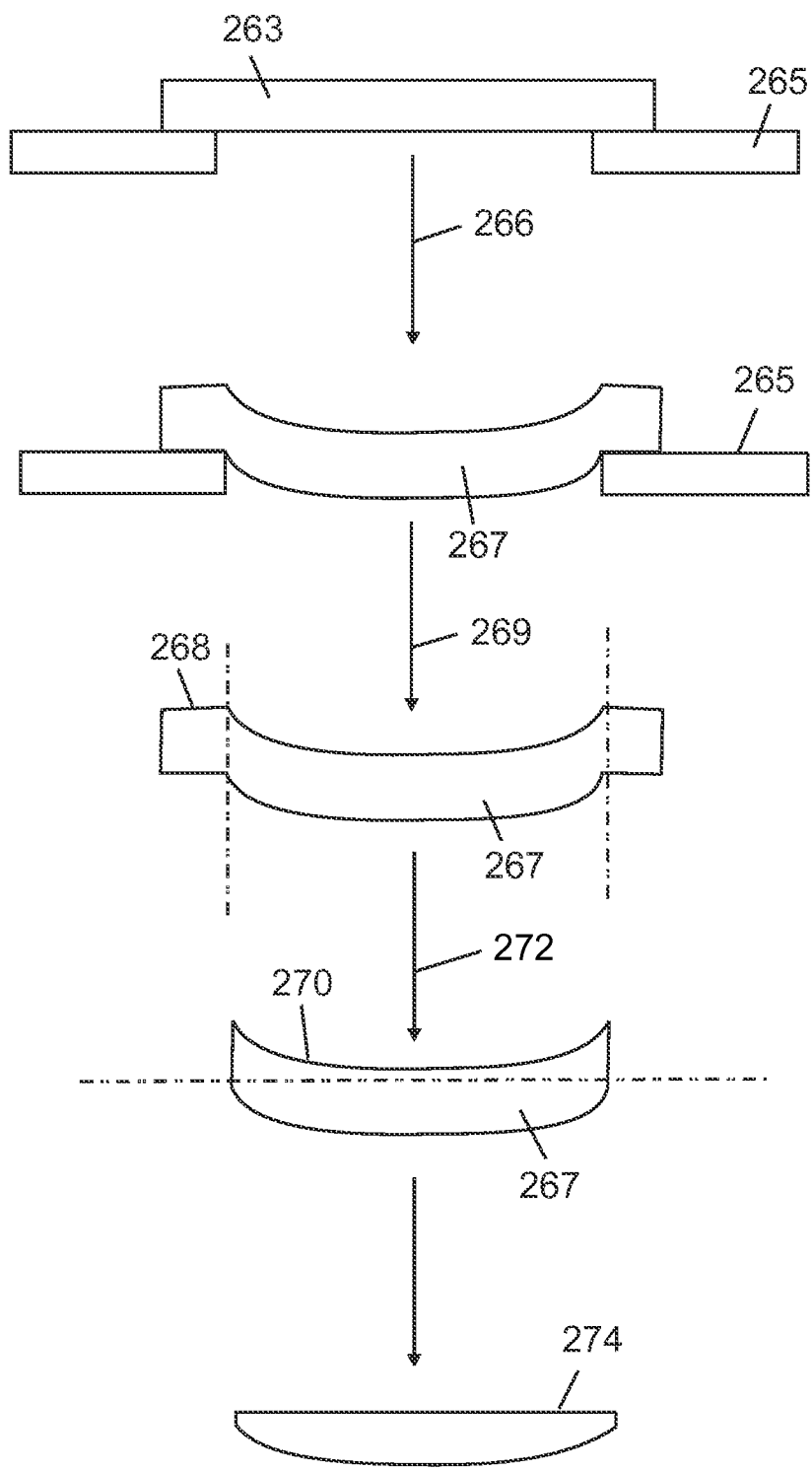
FIG. 17 illustrates a method of forming a shaped article using a free-sag mold.

FIG. 17 is a simplified schematic of forming a shaped article using a free-sag mold. A flat glass sheet 263 is brought into the vicinity of a free-sag mold 265. The flat glass sheet 263 is then placed on the free-sag mold 265, as indicated by arrow 266, and allowed to sag naturally by gravity to form a glass sheet 267 with three-dimensional curvature. Sagging is preceded by heating of the glass sheet 263, either before or after placing the glass sheet 263 on the free-sag mold 265. After sagging, the sagged glass sheet 267 is cooled and removed from the free-sag mold 265. Then, the peripheral edge 268 of the sagged glass sheet 267 is milled off, as indicated by arrow 269. This is followed by flattening of the concave surface 270 of the shaped glass sheet 267, e.g., by grinding, lapping, and polishing, as indicated by arrow 272. The final glass article, having a plano-convex shape, is shown at 274. As in the previous example, the glass article 274 may be subjected to one or more of annealing, chemically-strengthening by ion-exchange, and coating with anti-smudge coating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making shaped glass articles, comprising:
    placing a glass sheet having mid-infrared absorption on a mold having a shaping surface with a desired surface profile of a shaped glass article;
    heating the glass sheet by mid-infrared range radiation while the glass sheet is in the vicinity of the mold, whereby the glass sheet is preferentially and rapidly heated compared to the mold;
    conforming the glass sheet to the mold when a difference in temperature between the glass sheet and mold is at least 100° C. but less than 250° C., the conforming comprising applying vacuum between the glass sheet and the shaping surface so that at least a portion of the glass sheet assumes the desired shape profile, wherein at the time the vacuum is applied a temperature of the glass sheet is between an annealing point and a softening point of the glass sheet; and
    removing the glass sheet having at least a portion that assumes the desired shape profile from the mold.

2. A method according to claim 1, wherein the glass sheet is allowed to sag towards the shaping surface by gravity prior to applying the vacuum.

3. A method according to claim 1, further comprising cooling down the sagged glass sheet in the mold prior to removing the sagged glass sheet from the mold.

4. A method according to claim 1, further comprising cutting the sagged glass sheet to obtain the shaped glass article in a selected size.

5. A method according to claim 4, further comprising at least one of annealing the sagged glass sheet, chemically-strengthening the shaped glass article, and applying anti-smudge coating on the shaped glass article.

6. A method according to claim 1, further comprising cutting the glass sheet to a net shape required for forming the shaped glass article in a selected size prior to placing the glass sheet on the mold, the net shape being such that after sagging the glass sheet the shaped glass article has a net size without a further cutting step.

7. A method according to claim 1, wherein the glass sheet is placed on a plurality of molds in the placing step, the glass sheet is preferentially and rapidly heated by mid-infrared range radiation while in the vicinity of the plurality of molds in the heating step, and the vacuum is applied between the glass sheet and the shaping surfaces of the molds in the applying step.

8. A method according to claim 7, further comprising dicing the shaped glass sheet to obtain a plurality of shaped glass articles.

9. A method according to claim 8, further comprising at least one of annealing the shaped glass sheet, chemically-strengthening the shaped glass articles, and applying anti-smudge coating on the shaped glass articles.

10. The method of claim 1, wherein the shaping surface of the mold is convex and the glass sheet after conforming has a concave surface, and further comprising removing material from the glass sheet to flatten the concave surface and form a glass article having a plano-convex shape.

11. A method of making shaped glass articles, comprising:
    placing a glass sheet having mid-infrared absorption on a mold having a shaping surface with a desired surface profile of a shaped glass article;
    heating the glass sheet by mid-infrared range radiation while the glass sheet is in the vicinity of the mold, whereby the glass sheet is preferentially and rapidly heated compared to the mold;
    conforming the glass sheet to the mold when the glass sheet is at a viscosity greater than $10^7$ P but less than $10^{9.1}$ P and a difference in temperature between the glass sheet and mold is at least 100° C. but less than 250° C., the conforming comprising applying vacuum between the glass sheet and the shaping surface so that at least a portion of the glass sheet assumes the desired shape profile; and
    removing the glass sheet having at least a portion that assumes the desired shape profile from the mold.

* * * * *